Jan. 14, 1969 L. S. BELL 3,421,450
TRANSPORTATION SYSTEM
Filed Oct. 22, 1965 Sheet 1 of 13
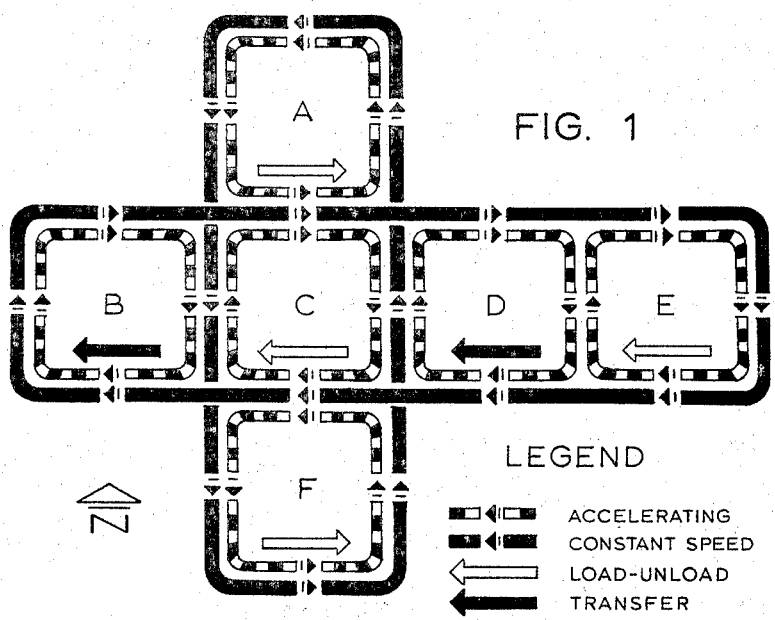
FIG. 1
LEGEND
- ACCELERATING
- CONSTANT SPEED
- LOAD-UNLOAD
- TRANSFER
FIG. 2-A
FIG. 2-B
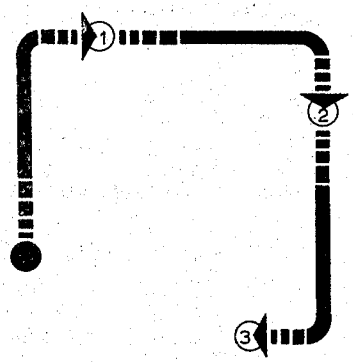
● ORIGIN
| FIG. 2-A | | FIG. 2-B | |
|---|---|---|---|
| ①  1 TRIP   0 STOPS | | ①  1 TRIP   0 STOPS | |
| ②  2 TRIPS  1 STOP | | ②  2 TRIPS  1 STOP | |
| ③  1 TRIP   0 STOPS | | ③  3 TRIPS  2 STOPS | |

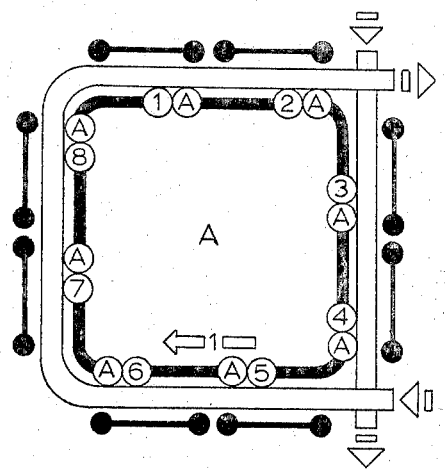
FIG. 3-A
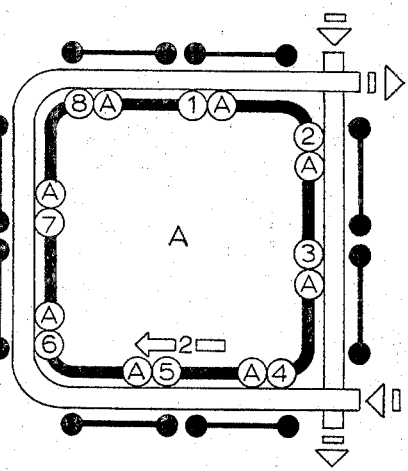
FIG. 3-B
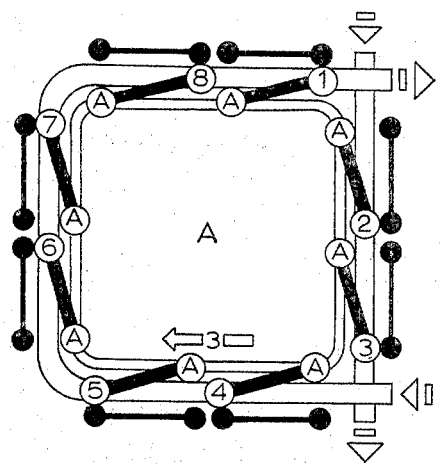
FIG. 3-C
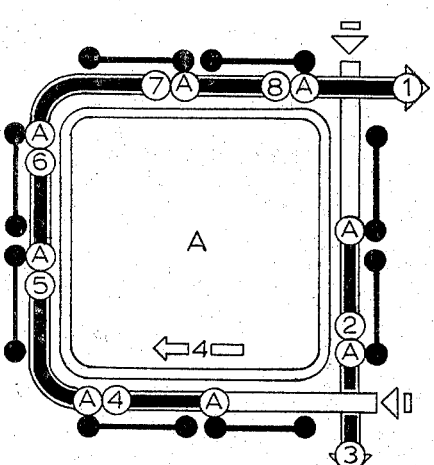
FIG. 3-D
LEGEND
⇐1⇐ LOAD-UNLOAD
⇐2⇐ BEGIN TRANSFER
⇐3⇐ TRANSFER 1ST UNIT
⇐4⇐ END TRANSFER
①—Ⓐ TRANSFER GROUP
●—● TRANSFER ZONE

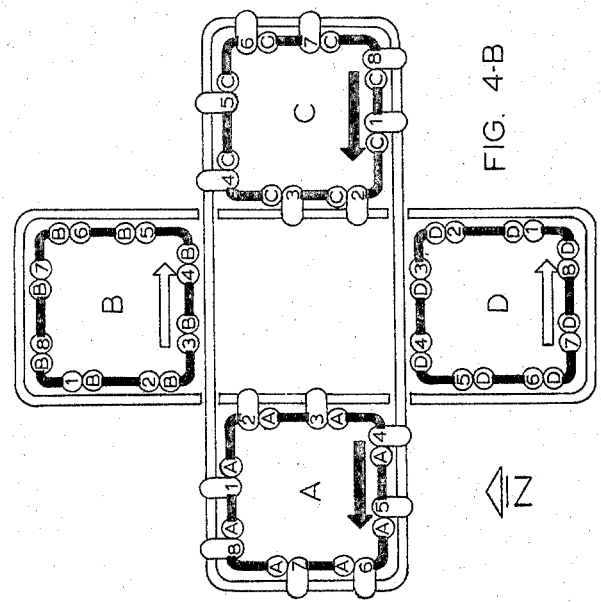
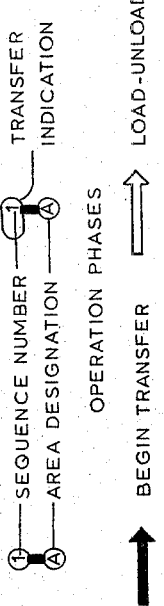
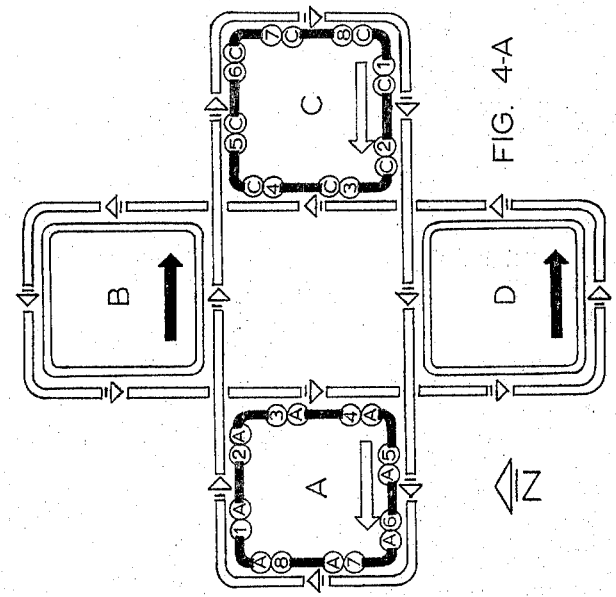

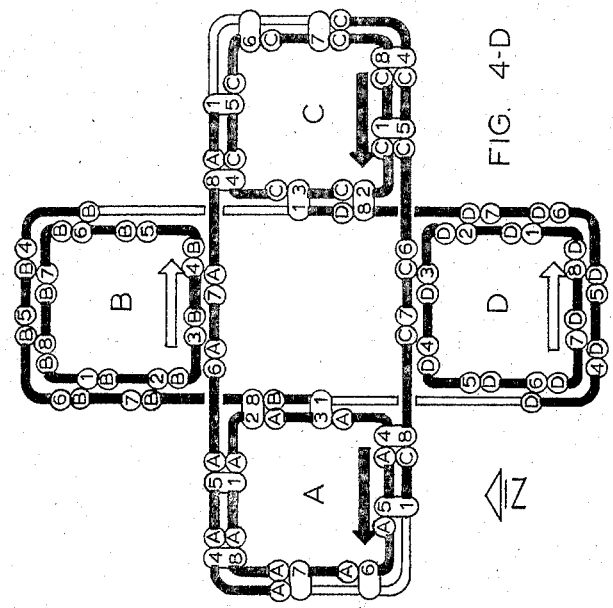

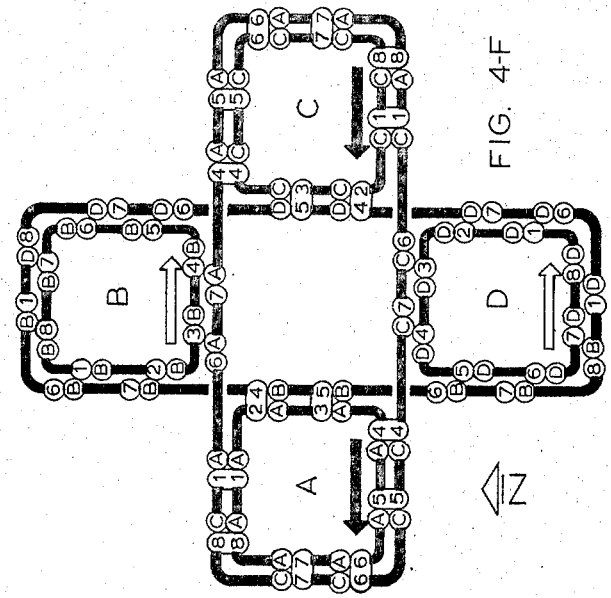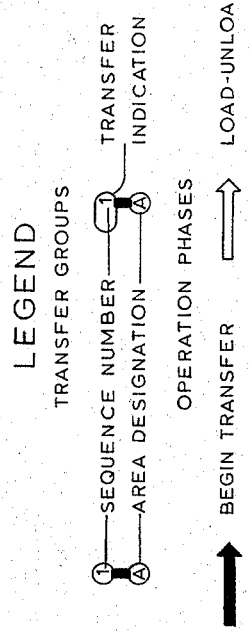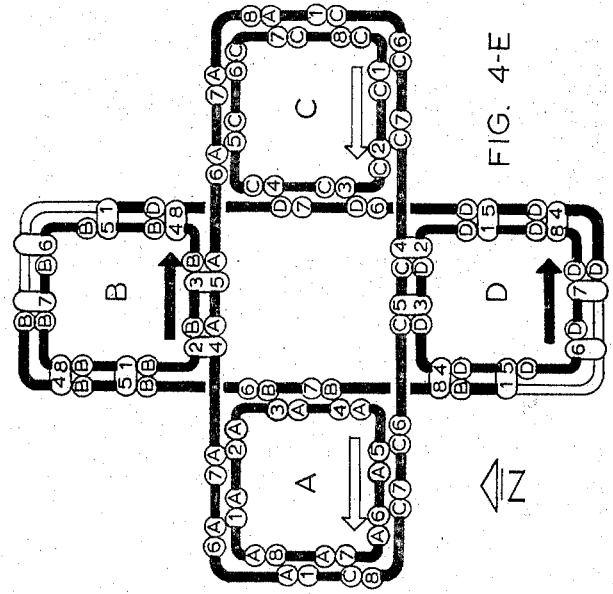

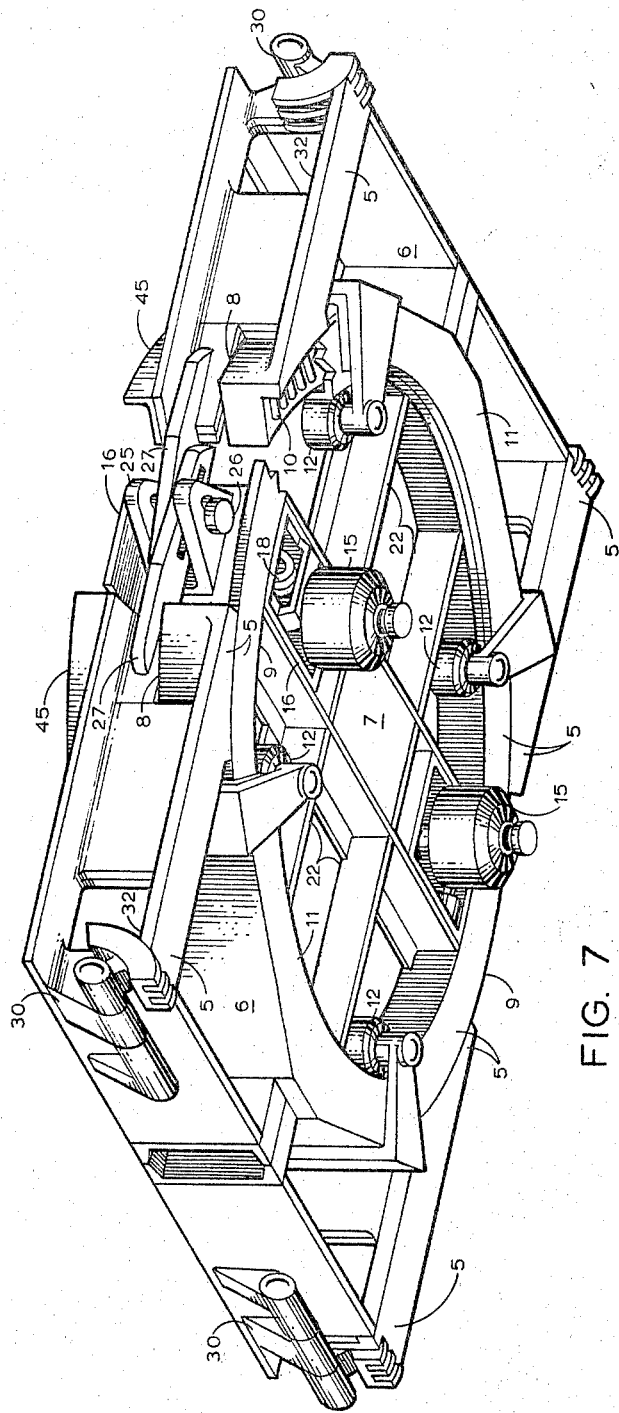

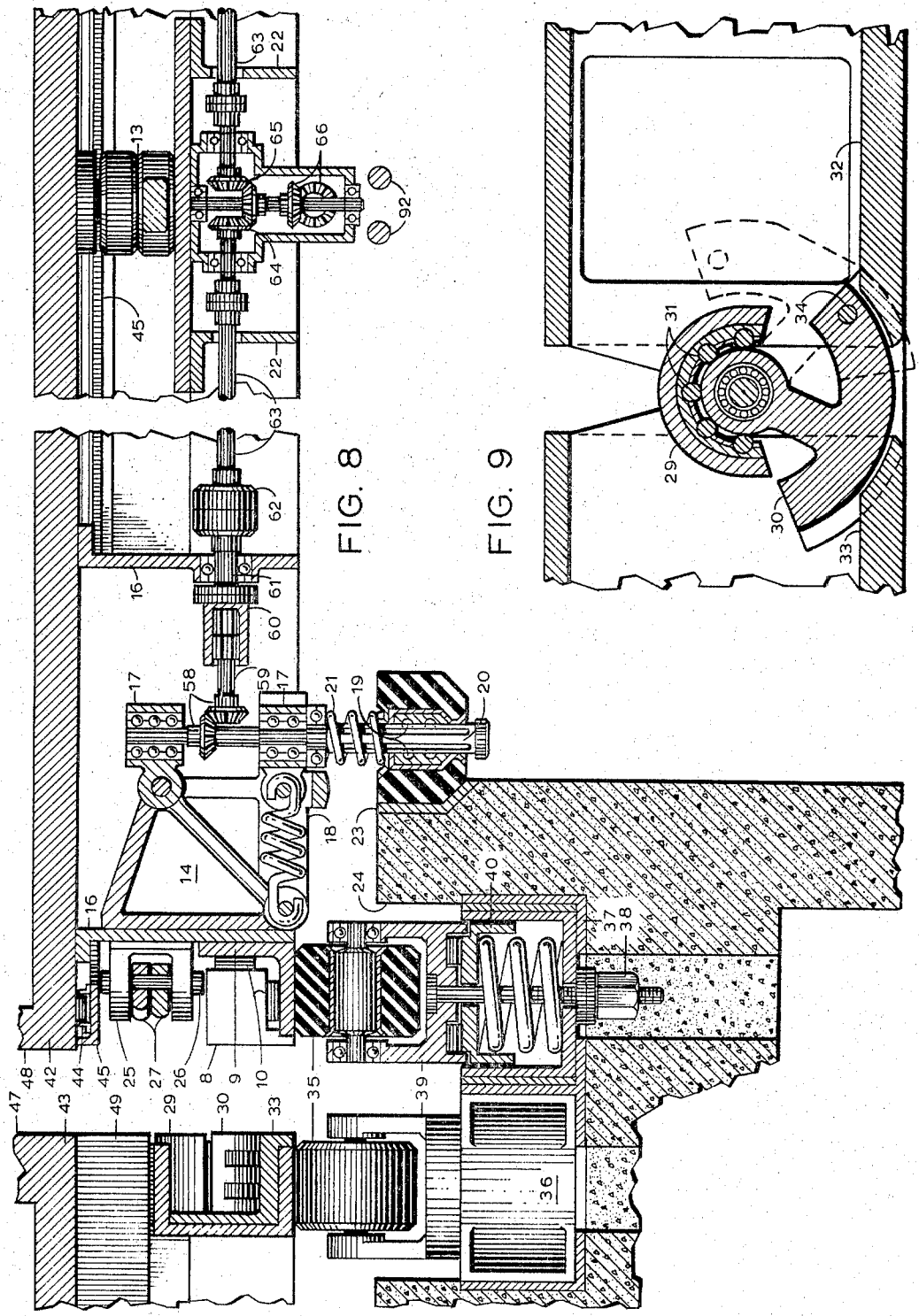

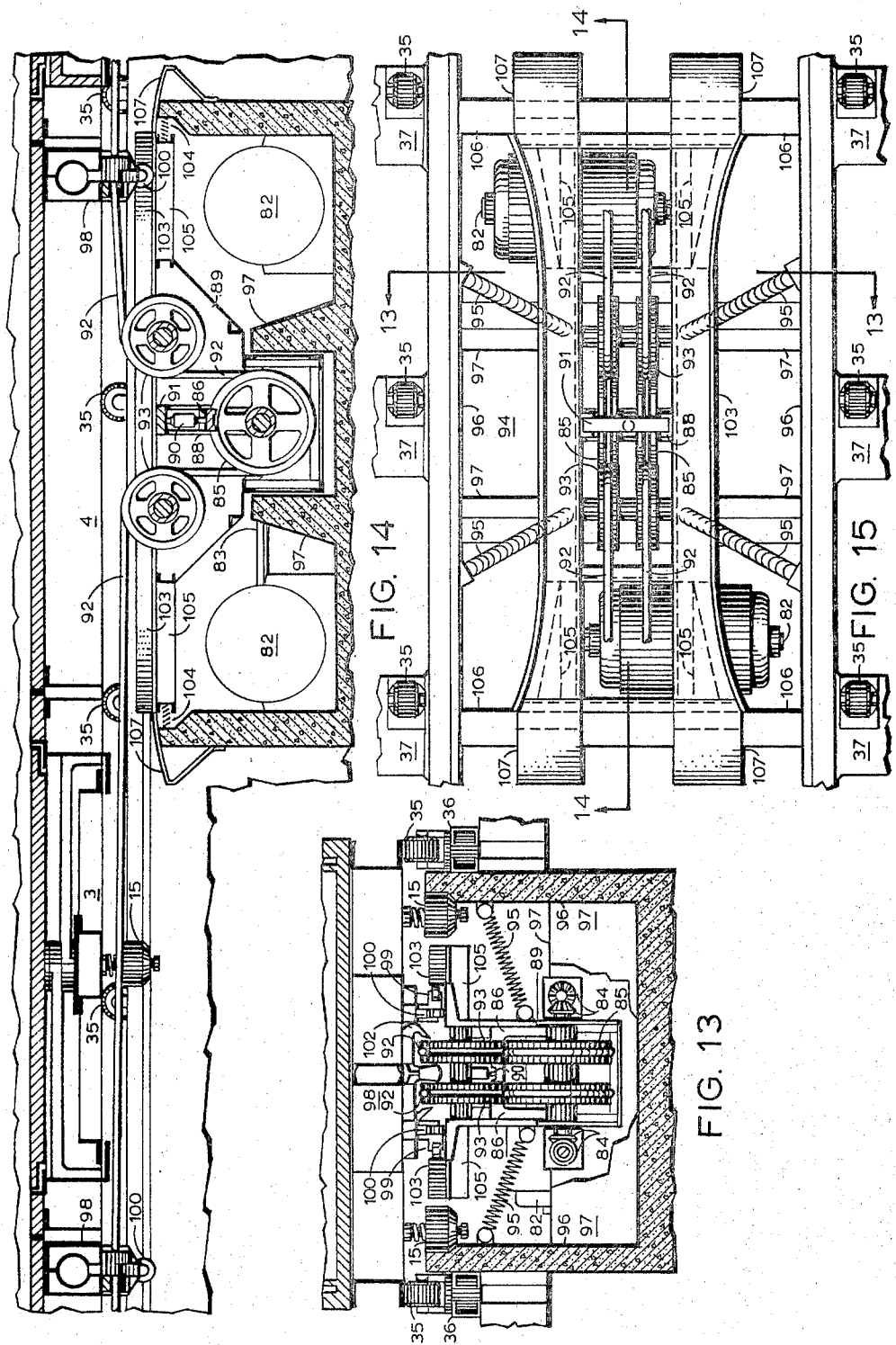

United States Patent Office

3,421,450
Patented Jan. 14, 1969

3,421,450
TRANSPORTATION SYSTEM
Larry S. Bell, Champaign, Ill.
(1310 Mitchem, Urbana, Ill. 61801)
Filed Oct. 22, 1965, Ser. No. 500,750
U.S. Cl. 104—20      7 Claims
Int. Cl. B61k *1/00;* A63g *1/00*

ABSTRACT OF THE DISCLOSURE

A transportation system has an elongate closed loop constant speed conveyor and a series of closed loop variable speed conveyors each of which picks-up loads from a number of stationary platforms spaced about its loop and accelerates to the speed of the constant speed conveyor to interchange its load therewith and then stops to pick-up another load. All of the conveyors are synchronized so that loads are transported between any two stationary platforms within uninterrupted forward motion. A pair of semicircular platforms are brought into alignment and then rotatably exchanged to effect load interchange between the conveyors and the stationary platforms.

---

This invention relates to transportation systems comprising endless trains adapted for moving large numbers of passengers through and about areas of high population density. More specifically, my invention relates to transportation systems in which two basic types of adjacent conveyor trains, or "synchroveyors," are provided; one which operates continuously at a constant speed, while the other varies in speed from standstill to a speed equal to the constant speed train so as to enable passenger interchange.

In the embodiments of the invention illustrated and described herein a new concept in the art of transportation is disclosed including pluralities of endless circuit conveyors dispositioned and synchronized to provide, as a fundamental object, constant speed transportation between areas of a city, and simultaneously, short interval transportation about those areas.

A second fundamental object of the invention is to provide a multi-directional transportation system which will provide automatic transfer of individual enroute passengers without delaying or inconveniencing other passengers. In connection with this object the invention discloses novel means which enable individual passengers to transfer between constant speed facilities (synchroveyors) moving in different directions, and exit independently to destinations of choice.

Another object is to provide mechanical transfer apparatus for safe and automatic loading, unloading, and enroute inter change of passengers at points continuously along the system.

A further object of my invention is to provide a transportation system that can be adapted to meet changing traffic needs that exist through different periods of the day, that can be adapted to fulfill specific transportation requirements of individual cities, and that allows additional inter-acting facilities to be added as subsequent needs arise.

Another object of the invention is to provide substantially rigid synchroveyors which have vertical and lateral flexibility between units, yet retain surface continuity.

An additional object is to provide drive apparatus which transfers motive power from stationary sources to the synchroveyors with positive control and smooth operation.

For a more comprehensive understanding of my invention and its objects and advantages, references is made to the following description, including the accompanying drawings, in which:

FIGURE 1 is a schematic plan view of an illustrative synchroveyor system. The arrows refer to the directions of movement;

FIGURE 2–A is a schematic top plan view of a preferred operation sequence when accelerating synchroveyors are used independently;

FIGURE 2–B is a schematic top plan view of a preferred operation sequence for accelerating synchroveyors when both types of synchroveyors are operated simultaneously;

FIGURES 3–A through 3–D are enlarged partial plan views illustrating operation and passenger transfer through successive intervals of time;

FIGURES 4–A through 4–F are schematic plan views illustating passenger transfer, traffic flow, and sequence relationships through successive intervals of time;

FIGURE 7 is an enlarged isometric skeleton view showing the underside of the flexure unit illustrated in FIGURE 6;

FIGURE 8 is a vertical section view taken through portions of a flexure unit and track beam to illustrate in detail certain preferred embodiments of support wheel assemblies and transfer deck power trains;

FIGURE 9 is a vertical section view showing a preferred type of mechanical coupling;

FIGURE 13 is a vertical section view taken along line 13–13 of FIGURE 15, showing a typical drive station, and including a portion of a synchroveyor. The illustrated cable clamp has reached a position directly over the drive station and has released segments of cable it was holding;

Figure 17:
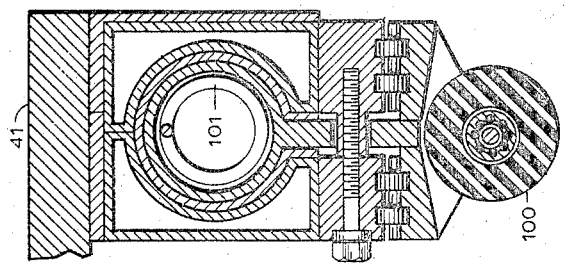
Figure 16:
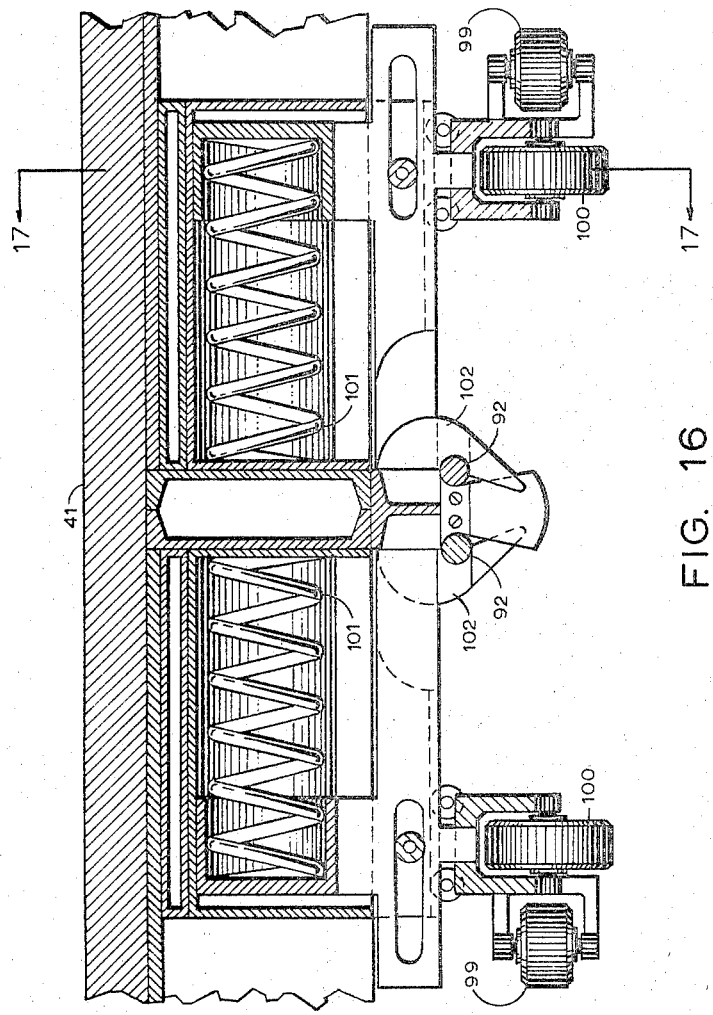

FIGURE 14 is a longitudinal section view taken along line 14—14 of FIGURE 15 showing a typical drive station and including a portion of a synchroveyor. The cable clamp to the right of the pulley assembly still retains the cables. The included portion of the synchroveyor is not shown in FIGURE 15;

FIGURE 15 is a top plan view of a typical drive station, with the synchroveyor removed for purposes of clarity;

FIGURE 16 is an enlarged longitudinal section view of a cable clamp in which the cables are being retained; and FIGURE 17 is a vertical section view taken along line 17–17 of FIGURE 16.

The synchroveyor system disclosed fundamentally comprises continuous train circuits disposed and synchronized so that two or more variable speed synchroveyors operate inside and interchange loads with one or more constant speed synchroveyors. The variable speed or accelerating synchroveyors load and unload passengers, then accelerate to the speed of the constant speed synchroveyors, effect a passenger interchange, and then decelerate and stop to again load and unload. The sequence is repetitive.

The accelerating synchroveyors are synchronized to assure that interchange passengers will reach successive accelerating synchroveyors during their constant speed phase to assure transfer and exit opportunities. The passengers can transfer between constant speed synchroveyors oriented in different directions by using accelerating synchroveyors as intermediary facilities to affect turns. To effect this, preferably at least one accelerating synchroveyor has substantial lengths which lie adjacent to two or more constant speed synchroveyors. The accelerating synchroveyors can be used independently when transportation demands do not warrant operation of both types of facilities.

The preferred arrangement for automatic load transfer is a system of substantially identical semicircular passenger transfer decks located at points continuously along the synchroveyors and the loading platforms (pedestrian walks). Transfer decks on these adjacent facilities come into alignment opposite each other, flat sides together, and at predetermined intervals of time, or upon passing predetermined points in space, each opposing pair of transfer decks rotates integrally by 180 degrees to furnish a separate bi-directional transfer.

Generally stated, a preferred means of propulsion will be disclosed in which motive power is imparted to the synchroveyors by stationary "drive stations" comprised of power sources, power trains, and frictional drive systems. Drive stations are located at spacing intervals required for specific installations beneath the synchroveyors.

Driving power is applied to continuous cables fixed to the undersides of synchroveyors at short intervals, by multiplicities of spring operated clamps. Each successive clamp releases segments of cable upon passing over a drive station, and then takes them up again after the segments have passed through driving pulley assemblies. Hydraulic cylinders affect tensioning of cables to compensate for slack and to provide driving friction.

*General operation description*

Referring to the drawings, and particularly to FIGURE 1, an exemplary system of mass transportation is disclosed in accordance with the invention in which areas designated A through F, inclusive, are enclosed by series of accelerating synchroveyors (indicated by segmented lines) which are interconnected by elongate constant speed synchroveyors loops (indicated by solid lines). The constant speed synchroveyors preferably operate at a constant speed and at relatively constant heights over the total length of the system. The constant speed synchroveyor, which for illustrative purposes is oriented with its elongate dimension in a north-south direction, preferably has altitude separation from the constant speed synchroveyor oriented in an east-west direction, thereby eliminating intersections in one plane. Accelerating synchroveyors generally move in the same direction and change altitudes on curves to operate in the same planes as do the adjacent portions of the constant speed synchroveyors. During an acceleration-transfer-stop sequence any given point of an accelerating synchroveyors should preferably travel a distance approximately equal in length to one side of the area it serves, or approximately one-fourth of its circuit length. The length of any one side of a typical area enclosed by a loop may be taken to be, for illustrative purposes, three city blocks, thereby assuring a minimum passenger destination accuracy of one and one-half blocks.

Passengers may board or exit from accelerating synchroveyors at nearly all points along the peripheries of the designated areas at short intervals of time, and may either choose to use the facilities for short distances travel about the areas, or as means of access to constant speed synchroveyors travelling substantially greater distances. It should be noted that north-south portions of accelerating synchroveyors between areas B and C, C and D, and D and E travel in opposite directions to provide two-way transportation across the areas, which need not necessarily occur at one level.

Again referring to FIGURE 1, black and white arrows indicate operational phases of the accelerating synchroveyors at a given instant in time to illustrate a typical relationship between operation sequences of the various areas. Generally stated, passengers who are transferring from accelerating synchroveyors to constant speed synchroveyors on the northern and southern boundaries of areas B and D will reach areas A, C, E, or F at such times that synchroveyors in those areas are in their transfer phase, thus assuring transfer and exit opportunities in each area. Passengers who are transferring to the constant speed synchroveyor along the western boundary of area B can transfer along the eastern boundary of area E only, and if intermediate area destinations are desired, initial transfer should be delayed.

The north-south or east-west constant speed circuits can be increased to include any number of accelerating synchroveyors and so long as the fundamental alternate sequence order is observed, suitable transfer opportunities will result. Special note should be made that areas A, C and F can be in the same phase sequence since passenger interchange between areas A and C or C and F are of small benefit and because opposing motion of synchroveyors along east and west boundaries of area C renders passenger interchange and impossibility.

It is evident that accelerating synchroveyors can be added to areas not included within constant speed facilities or subtracted from intermediate locations as required. Further, the system need not necessarily be multi-directional. The number of circuits, dimensions of circuits, sequence timing, and operating speeds will depend entirely on specific installation requirements.

Transportation demands vary greatly in type and amount during different periods of the day. In downtown city areas during rush periods demands for mass transportation are many times greater than at other times of the day and a heavy bulk of travel is between the central and the extremity areas of the city, and also trans-city. In these periods the accelerating and constant speed synchroveyors can be operated together as described. At other periods during the day, when passenger loads are less and traffic flow is primarily intra-city, conditions may not warrant operation of constant speed synchroveyors. For these periods an alternate operation sequence for accelerating synchroveyors is disclosed.

Referring to FIGURES 2–A and 2–B, a comparison is illustrated between two operation sequences of accelerating synchroveyors. FIGURE 2–A schematically represents a preferred sequence for synchroveyors when only the accelerating facilities are in operation, in which two forward "trips" (accelerate-stop sequences) are followed by one reverse trip. FIGURE 2–B schematically represents a preferred sequence for accelerating synchroveyors when constant speed synchroveyors are operated simultaneously. It is readily evident from the diagrams that given an arbitrary point of origin, and destinations 1, 2 and 3 FIGURE 2–A represents the most consistently efficient schematic of motion. Passengers wishing to travel to destination 3 would preferably board the facility represented by FIGURE 2–A on the reverse sequence, and travel there directly without intermediate stops.

*Specific operation description*

Passenger interchange is preferably effected between adjacent portions of the accelerating and constant speed synchroveyors within the time and distance required for the accelerating synchroveyors to travel approximately one-fourth of their circuit length. FIGURES 3–A through 3–D schematically represent preferred means for effecting total interchange between adjacent portions of circutis within a single operation sequence, by illustrating through successive intervals of time (or phases) the developments in passenger movement and transfer. For purposes of clarity, the diagrams indicate only passenger movements and transfer from the accelerating synchroveyors to the constant speed synchroveyors, and all passengers are assumed to desire transfer.

Referring to the legend for FIGURES 3-A through 3-D, it may be seen that the white arrows designated 1 through 4, inclusive, indicate successive time intervals, or operation phases. Passengers who enter the transportation system within common loading bounds will have common opportunities to initially transfer within specific intervals of travel, or "transfer zones" along adjacent portions of synchroveyors. These groups, originating within common limits, will be referred to as "transfer groups" designated in the drawings by sequence numbers to indicate relative initial positions and letters to indicate areas of origin. Each passenger will preferably receive two transfer opportunities within each transfer zone.

FIGURE 3-A is an enlarged illustration of the area A appearing in FIGURES 4-A through 4-F, showing the original positions of the transfer groups at such time that the accelerating synchroveyor is stationary and in a load-unload phase. Arrows indicate the direction of motion of the constant speed synchroveyors. The distance between the sequence number bubble at the head of each transfer group, and the rear portion of the next transfer zone ahead of the bubble, is the approximate distance required for the accelerating synchroveyors to accelerate to the speed of the constant speed synchroveyors and effect proper transfer alignment.

FIGURE 3-B shows the same area at the beginning of the transfer phase when the accelerating synchroveyor is moving at the same speed as the constant speed synchroveyor and alignment for transfer has been accomplished. Transfer groups have entered their respective transfer zones.

FIGURE 3-C shows the area at the time the first units of the transfer groups have completed their transfer operations (preferably two transfers) and other units are in successive stages of transfer, progressing from the rearwardmost units. The degree of transfer cycle completion is represented schematically by the perpendicular distance from the transfer group indication lines to the center lines of the constant speed synchroveyors.

FIGURE 3-D shows the area at the completion of the transfer phase after all transfer groups have had an opportunity to transfer to the constant speed synchroveyor. Since interchange occurs simultaneously in both directions, passengers on the adjacent portion of the constant speed synchroveyor have completed transfer also. Special note should be made that the accelerating synchroveyor can be evacuated in its entirety. The accelerating synchroveyor will now decelerate to a stop and the sequence will be repeated.

It is evident that the rate of acceleration, transfer time, and length of transfer zones are fundamental determinants of the rate of speed that can be achieved with the system. Given, that area lengths are four city blocks, acceleration and alignment require fifteen seconds, and each mechanical transfer operation (providing two separate transfers) requires fifteen seconds, speeds approaching thirty miles per hour are anticipated.

Referring to FIGURES 4-A through 4-F, a concept of total operation is disclosed to illustrate preferred progress of movement and transfer between areas through successive intervals of time (phases). Transfer is effected in accordance with the method described in the foregoing discussion, and is illustrated in FIGURES 3-A through 3-D. "Transfer first unit" and "end transfer phases" are omitted in order to avoid possible confusion. The transfer indication, illustrated as an elongated bubble, represents a transfer opportunity between accelerating and constant speed synchroveyors. Transfer group designations are similar to those shown in FIGURES 3-A through 3-D. As a convention, following the interchanges between two transfer groups (indicated by two numbers within transfer indication bubbles), newly combined transfer groups carry the sequence number and area designation of the earliest departing group.

FIGURE 4-A represents a typical synchroveyor installation. Only transfer groups departing areas A and C are indicated in order to simplify the diagram. As shown, the accelerating synchroveyors in areas A and C are in their stationary load-unload phase, and transfer group positioning is similar to that illustrated in FIGURE 3-A.

FIGURE 4-B shows transfer beginning to occur along areas A and C in a manner similar to that illustrated in FIGURE 3-B. Accelerating synchroveyors defining areas B and D have stopped to load and unload passengers.

FIGURE 4-C reveals passenger transfer occurring between transfer groups originating in areas A and B, A and D, C and B, and C and D. As previously stated, combined transfer groups resulting from interchange will carry the identification of the earliest departures, designated in this case, areas A or C. Areas A and C are again loading new passengers and transfer is beginning in all transfer groups departing areas B and D.

FIGURE 4-D shows certain advanced transfer groups that departed from areas A and C beginning to transfer passengers in areas most distant from their origin. Other groups originating in areas B and D have begun to transfer into A and C. Passengers are boarding and exiting in areas B and D.

FIGURE 4-E indicates a third load of passengers boarding in areas A and C while movement progresses along the system. Passenger transfer occurring in areas B and D will complete the constant speed circuits. Again, loading and unloading is occurring in areas A and C.

FIGURE 4-F shows the completed constant speed circuits and illustrates that forwardmost units originating in areas A and C have reached their most distant transfer destinations. The operation sequences and transfer phases will continue, and as passengers within each transfer group reach their respective destinations, new transfer groups will be added to the system.

*General description of preferred construction*

Figure 5:
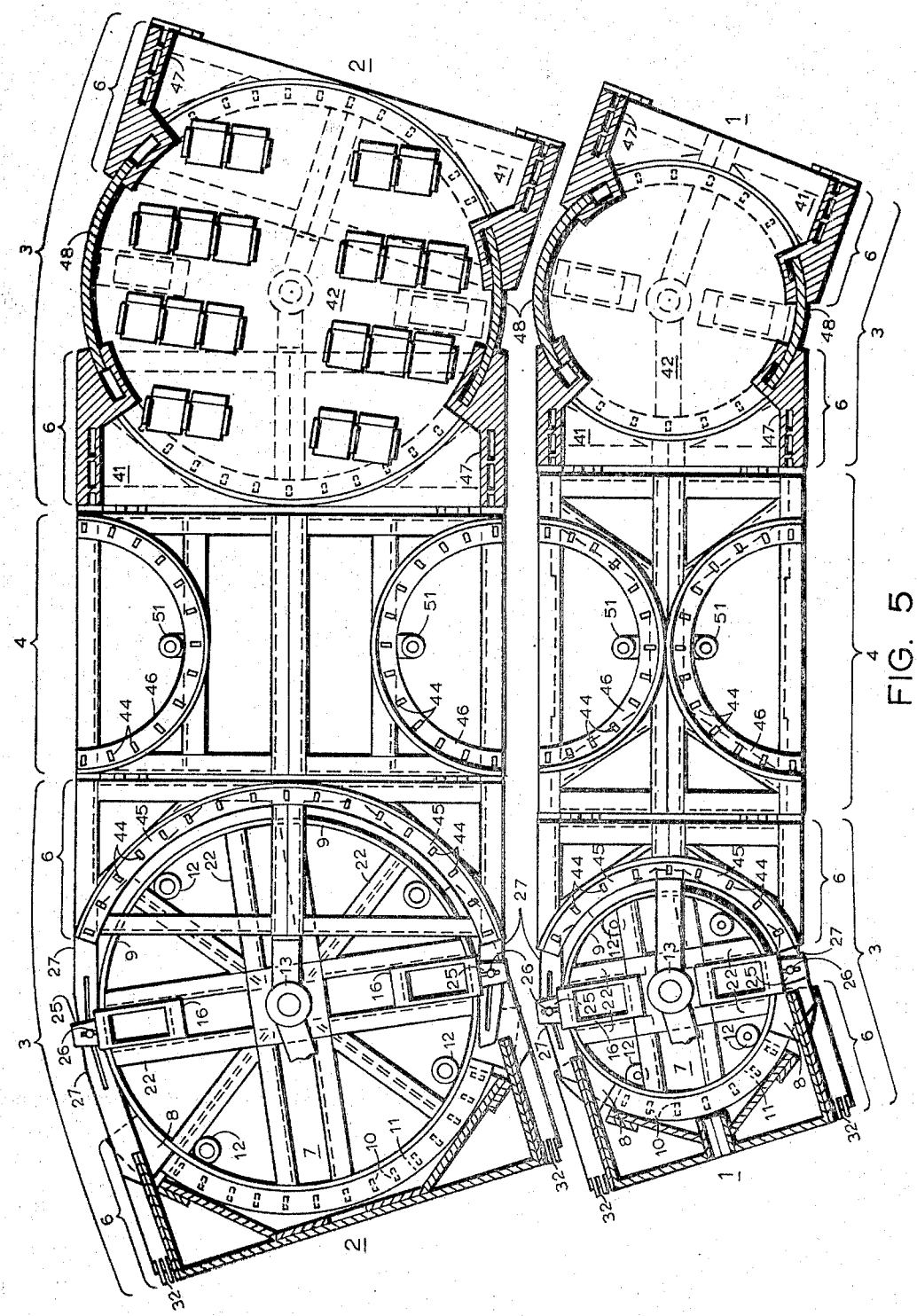
FIGURE 5 shows a plan view of a preferred construction of the repetitive units of the accelerating and constant speed synchroveyors. Horizontal flexure is shown.
Figure 6:
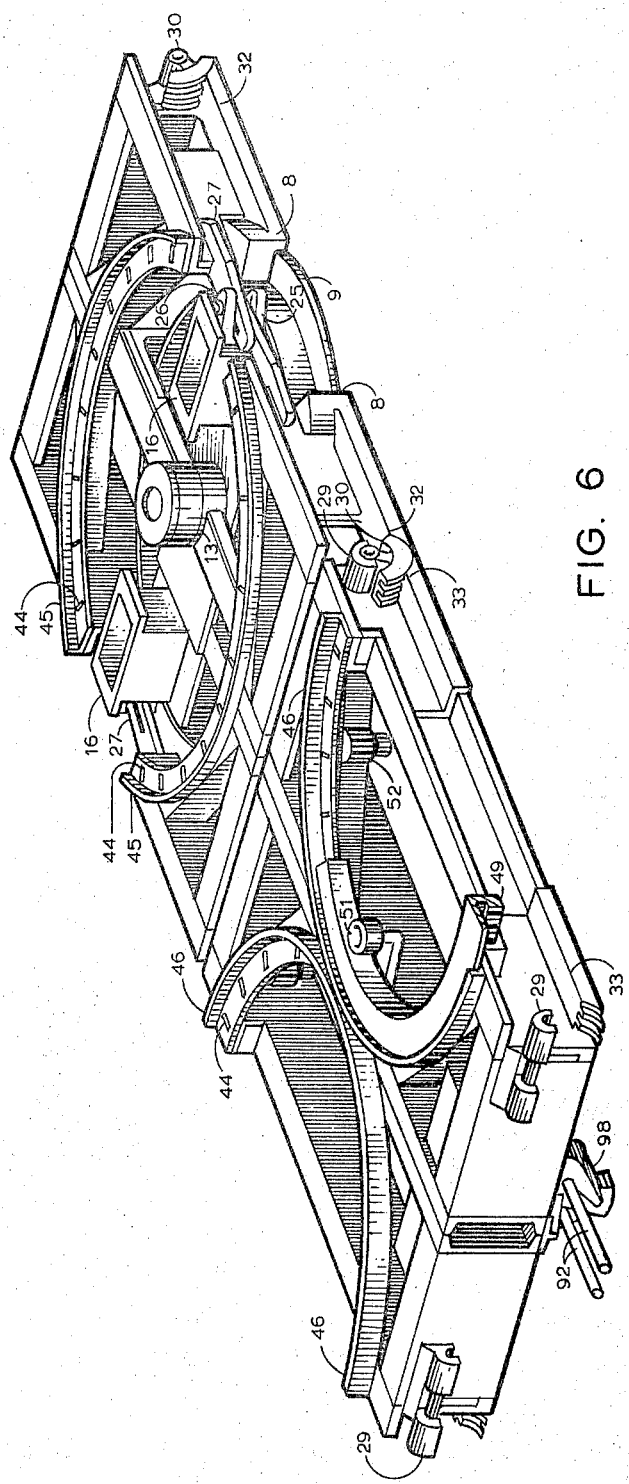
FIGURE 6 is an isometric skeleton view of a typical transfer unit and a connected flexure unit of an accelerating synchroveyor.

Referring to FIGURES 5–7 in particular, the preferred embodiments of conveyors for the above described systems comprise endless conveyors defined by trains of two different conveyor units, alternately connected end to end. They are preferably supported by replaceable resilient wheels mounted independently to support structures.

FIGURE 3 illustrates a section of an accelerating synchroveyor 1, and adjacent constant speed synchroveyor 2. Preferably they are virtually identical, and each has a flexure unit 3 (see FIGURES 6 and 7) fundamentally comprising two short, straight, sections of platform called connection assemblies 6, coupled at the centers of circular platforms which will be referred to as coupling ring assemblies 7. The flexure units 3 lend lateral flexibility to the synchroveyors 1 and 2 and maintain continuous, flat, rolling contact surfaces 5 for support wheels 35 during flexure. The other basic units are transfer units 4, containing transfer decks 43 and their associated apparatus. These are described in detail in a subsequent description of the transfer mechanisms.

Hinge couplings 28 provide continuity of the contact surfaces 5 between the flexure units 3 and the transfer units 4 when portions of the synchroveyors 1 and 2 bend vertically to effect elevation changes.

As a result of the foregoing preferred construction embodiments, synchroveyors 1 and 2, although comprised of substantially rigid members, can bend and flex without discontinuity of contact surfaces 5 which would do injury to the roll table. It is evident that continuity of synchroveyor construction will facilitate maximum spacing of support wheels 35 for economical installation and maintenance.

Structural track beams 24 (particularly preferred for elevated synchroveyor installations) provide housings 37 for support wheel assemblies 36 and laterally guide the synchroveyors. (See FIGURES 8, 12, 13 and 15.) Guide wheels 15, projecting from the undersides of coupling ring assemblies 7, maintain rolling contact with track beams 24 to hold the synchroveyors in proper alignment and to convert forward motion into mechanical power for driving transfer apparatus.

To avoid the point congestion of customary compartmentalization of transportation facilities, continuous walking surfaces are provided along synchroveyors comprising fixed decks 41, circular decks 42, and transfer decks 43. Safety partitions 47 prevent improper boarding or exit, thereby protecting passengers from possible injuries that could result from differential movement between adjacent facilities. External stationary enclosures may be used to house and protect the system.

*Specifice description of preferred construction*

Referring to FIGURES 5 and 6, and particularly FIGURE 7, flexure units 3 maintain continuous contact surfaces 5 throughout flexure by means of the following described preferred structure.

Connector arms 8, included as parts of connection assemblies 6 are shaped to provide contact surface 5 links with coupling rings 9. Coupling rings 9 are angle-shaped in section and are included as parts of coupling ring assemblies 7. Roller bearings 10, mounted to connector arms 8 effect rolling contact with upper flange and outer web surfaces of coupling rings 9. When flexure occurs, connection assemblies 6 pivot about coupling ring assemblies 7, causing connector arms 8 to advance along coupling rings 9, thereby providing snug sliding junctures to preserve continuity of contact surfaces 5.

Roller bearings 10, mounted to upper surfaces of beds 11 and connector arms 8, contact flanges of coupling rings 9 from underneath and above, respectively, to retain the beforementioned sliding junctures in flat horizontal planes, thus preventing vertical separations or bending. Restraining wheels 12 mounted to connection assemblies 6 effect rolling contact against inner webs of coupling rings 9 and function in combination with couplings 13 to prevent longitudinal separation of connector arms 8 and coupling rings 9.

Guide wheel assemblies 14 reside in housings 16 secured to coupling ring reinforcement members 22. In FIGURE 8 pivotally mounted guide wheel axle housings 17 permit spring assemblies 18 to hold guide wheels 15 in compression against track beams 24. Guide wheels 15 preferably move up and down over bearings 19 residing in splined axle shafts 20 to compensate for vertical displacements of flexure units 3 resulting from loading variations. Springs 21 assure proper positioning of guide wheels 15 in plates 23 of track beams 24.

To assure proper synchroveyor alignment it is important that straight lines connecting centers of paired guide wheels 15 be perpendicular to contacting portions of track beam plates 23 at all times. In connection with the foregoing requirement a preferred apparatus is disclosed:

Referring to FIGURES 5, 6 and 7, slotted brackets 25 fixed to guide wheel housings 16 share pins 26 with slotted guide arms 27. When flexure occurs, resulting angularities between guide arms 27 retain pins 26 at angle verticies. Slots in brackets 25 allow pins 26 to move only along lines bisecting flexure angles, assuring that guide wheel housings 17 and associated guide wheels 15 are properly aligned.

Hinge-couplings 28 provide preferred transitional contact surfaces 5 and coupling between flexure units 3 and transfer units 4. Fundamentally, hinge-couplings 28 include hitches 29 secured to transfer units 4 and keys 30 secured to flexure units 3 (or vice-versa). During coupling, roller bearings 31 mounted to the inner surfaces of hitches 29, contact upper portions of keys 30 to form hinges between flexure units 3 and transfer units 4. Multiple flanges projecting from undersides of keys 30 reside in key slots provided in flanges 32 and 33. Flanged portions of keys 30 are preferably secured to either, but not both of the coupled units by pins 34.

It is evident from FIGURE 9 that when keys 30 are secured in position, vertical or horizontal separation of coupled units is prevented. As vertical bending occurs contact surfaces 5 on flanges 32 and 33 move apart, and the key flanges provide intermediate support wheel contact surfaces.

Uncoupling of flexure units 3 or transfer units 4 is accomplished by removing pins 34 and urging keys 30 into the position indicated by a dotted line in FIGURE 9 (this is done at four corners). Hatches in decks 41 and access holes in side members of synchroveyor units facilitate keying and unkeying operations.

Preferred roll tables comprise resilient wheels 35 mounted to spring assemblies 36, secured within housings 37 in track beam 24 in a manner which will enable removal from below. When replacement of support wheel apparatus is necessary, nuts 38 are tightened to compress springs in assemblies 36 and thereby lower wheels 35 away from contact surfaces 5. Replacement wheel apparatus is preferably installed at supplementary locations provided in housings 37 before replacement is initiated.

It may be desirable to provide support wheels 35, located along curved portions of the system, with mountings which will enable limited pivoting to prevent slide slippage against straight sections of contact surfaces 5. FIGURE 8 illustrates a pivotal mounting in which mounting 39 has roller bearing contact with piston 40. Mountings 39 should tilt back slightly or have built-in tilt to allow wheels 35 to follow small vector changes of contact surfaces 5.

When synchroveyor systems comprise large turning radii, side slippage will be negligible and special wheel mounting considerations need not exist.

To prevent passenger congestion along synchroveyors, passenger dispersal is made possible by the provision of continuous walking surfaces consisting of fixed decks 41, circular decks 42, and transfer decks 43. Rolling beds containing cylindrical or conical bearings 44, mounted to arc-shaped members 45 and 46, support edges of circular decks 42 and transfer decks 43 to permit differential movements between decks and supports. Circular decks 42 are secured to coupling ring assemblies 7 at central couplings 13 and at guide wheel housings 16 to prevent rotation during flexure (see FIGURE 5).

A preferred type of safety partition 47 (FIGURE 5) retains surface continuity during flexure by means of curved panels 48 set in receiving slots. As flexure occurs, the ends of the panels 48 are urged to move within the slots to effect necessary shortening or lengthening of partitions. Partition closure between flexure units 3 and transfer units 4 may be achieved by means of inserted panels, or cover plates secured to allow for differential movement due to bending of the synchroveyors on inclines or declines.

*General description of preferred transfer apparatus*

The preferred apparatus accomplishes automatic loading, unloading, and passenger interchange between moving facilities without dangers to passengers that could result from errors in individual judgment or personal handicaps.

Figure 10:
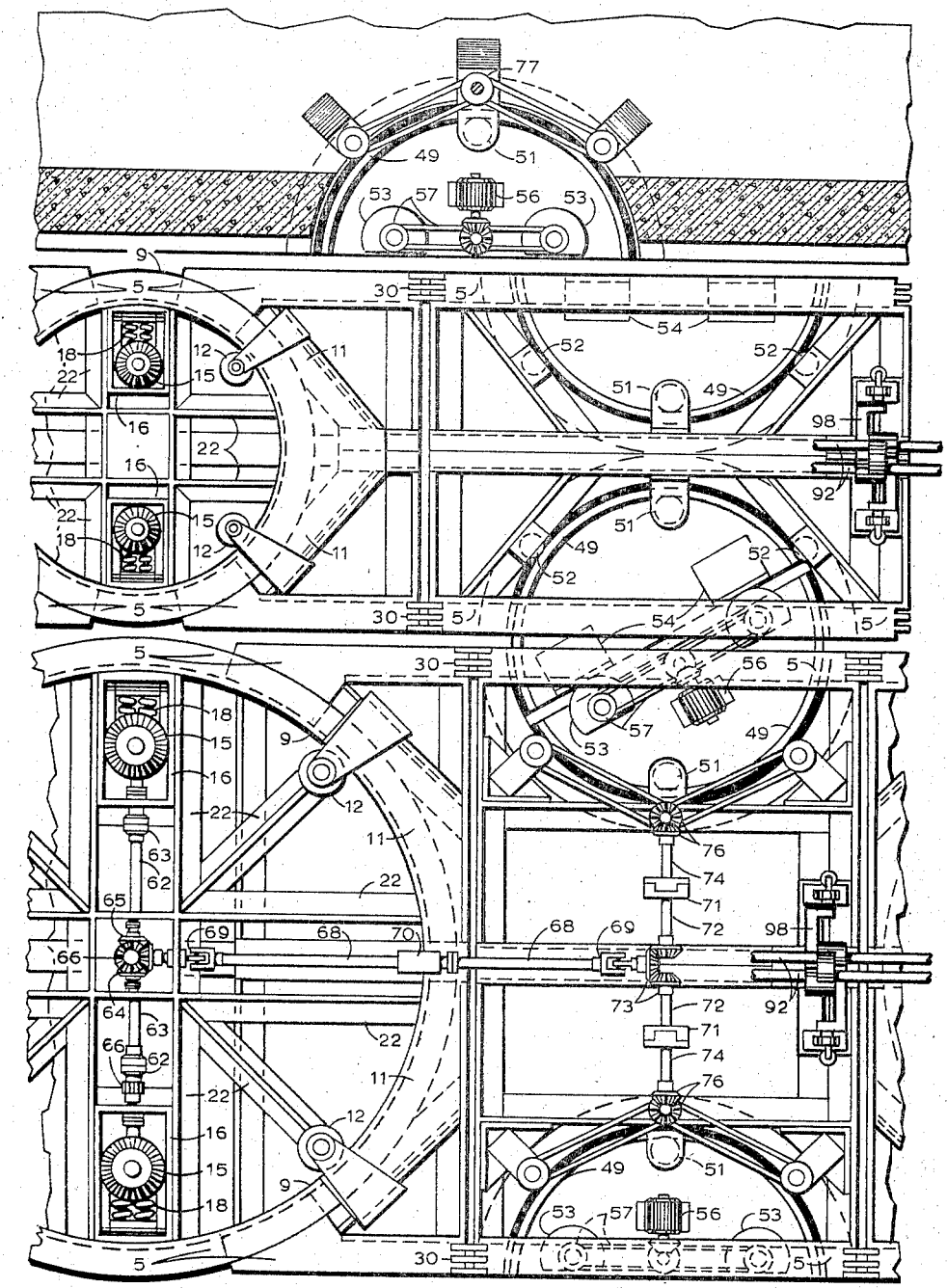
FIGURE 10 is a bottom plan view of portions of an adjacent constant speed synchroveyor, accelerating synchroveyor, and pedestrian walk. Mechanical passenger interchange is occurring between the constant speed and accelerating synchroveyors.
Figure 12:
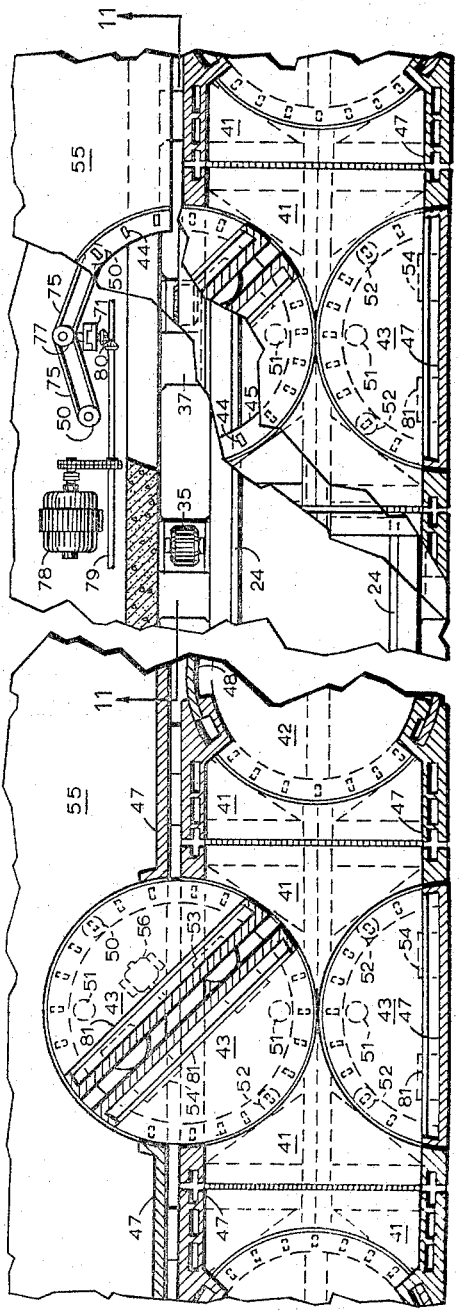
FIGURE 12 is a top plan view showing at three section levels an accelerating synchroveyor transferring with an adjacent pedestrian walk.

Passengers desiring to transfer between accelerating synchroveyors 1 and pedestrian walks 55 or between moving synchroveyors 2, may do so by simply positioning themselves upon semicircular transfer decks 43 and grasping safety rails 81 (FIGURE 12). During transfer phases aligned pairs of adjacent semicircular transfer decks 43 complete slow rotation cycles, each 180 degrees of rotation providing separate interchanges between groups of passengers. Safety partitions 47 prevent passenger transfer at improper times. Upon completion of transfer phases, transfer decks 43 have all reached their original orientation (flat sides parallel with sides of transfer units 4) and accelerating synchroveyors 1 can initiate acceleration or deceleration. Referring to FIGURES 10 and 12 it is readily evident that adjacent facilities are firmly locked together by transfer decks 43 whenever passenger interchange is in progress.

*Specific description of preferred transfer apparatus*

Referring to FIGURES 5 and 6, flanges of semicircular ring gears 49 attached to transfer decks 43 rest upon bearings 44 to enable free rotation. Semicircular ring gears 49 project below transfer decks 43 and are contacted by gears 50, idler wheels 51, and idler gears 52 which collectively hold the decks in place.

FIGURE 10 is a bottom plan view showing transfer apparatus and demonstrating passenger interchange between accelerating synchroveyor 1 and constant speed synchroveyor 2. Supporting track beams 24 are omitted for reasons of clarity. Following suitable alignment and prior to transfer deck rotation, cams 53 mounted to transfer decks along pedestrian walks 55 and constant speed synchroveyors 2 rotate to contact plates 54 fixed to the opposite deck, thereby bridging the clearance spaces between adjacent facilities. Cam rotation can be powered by motors 56 mounted to the decks to drive pulley-chain assemblies 58 or by any suitable drive system originating at transfer deck power trains. It should be evident that solenoids, or other bridging means can be substituted for cams 53.

The forward motion of synchroveyors 2 may be converted to power for rotating transfer decks 43 between moving facilities. FIGURES 8 and 10 illustrate a preferred transfer deck drive system of this type for enroute passenger interchange. Guide wheels 15 maintain rolling contact with track beam plates 23 to impart rotation through gears 58 to shafts 59. Keyed sleeves 60 fixed to shafts 61 receive shafts 59 to compensate for axial movements resulting from small lateral fluctuations of guide wheels 15. Ratchets 62 keyed to shafts 63 prevent differential angular velocities of gears 64 and 65 when guide wheels 15 oriented towards opposite sides of synchroveyors 2 attain different relative speeds on curves. Pairs of gears 66 keyed to shafts 63 on one side only serve to reverse shaft rotation to enable bevel gears 64 and 65 to cooperatively drive gear systems 67, thereby transferring combined power to drive shafts 68. Universal couplings 69 enable drive shafts 68 to effect vertical bending and/or lateral flexure and keyed sleeve couplings 70 compensate for resultant lengthening or shortening of the shafts during the foregoing conditions. Transfer cycles between adjacent pairs of enroute transfer units begin as individual clutches 71 transmit rotational power from shafts 72 connecting with drive shafts 68 through bevel gears 73, to shafts 74 connecting with pulley-chain assemblies 75 through bevel gears 76. Pulleys 77 drive gears 50 (see also FIGURES 6 and 11) which cause semicircular ring gears 49 and attached transfer decks 43 to rotate. After transfer decks 43 have completed their rotation cycles, clutches 71 disengage shafts 72 and 74 and motors 56 turn cams 53 180 degrees to their original orientations, flat sides out.

It will be evident that the concept of transfer deck interchange can easily be applied to transportation systems comprising moving platforms or compartments mounted to conventional mobile support wheels, in which case automotive type power trains or even portable power sources can drive the system.

It will be noted that the preferred passenger interchange between accelerating synchroveyors and pedestrian walks occurs simultaneously all along the system when the accelerating synchroveyor has stopped and is independent of transfer zones. Passenger interchange between stationary facilities is preferably motivated by stationary power sources.

Figure 11:
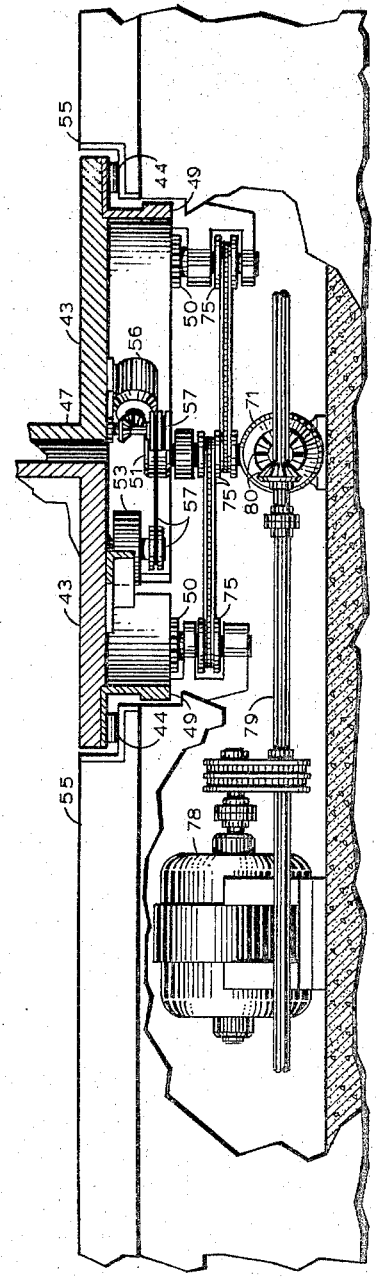
FIGURE 11 is an enlarged view, partly in section and partly in elevation, taken along line 11—11 of FIGURE 12 and showing preferred apparatus for the automatic transfer between the accelerating synchroveyors and pedestrian walks, with a transfer in progress.

Referring to FIGURE 10 and particularly to FIGURES 11 and 12, motors 78 drive shafts 79 which connect with clutch 71 through bevel gears 80. After proper alignment has been achieved between accelerating synchroveyors 1 and pedestrian walks 55, many of the ensuing mechanical events are identical to those disclosed for interchange between moving synchroveyors. Following the rotation of cams 53 to contact plates 54, motors 78 begin to turn shafts 79. Clutches 71 transmit rotational power from shafts 72 connecting with shafts 79, through bevel gears 80, to shafts 74, connecting with pulley-chain assemblies through bevel gears 76. Pulleys 77 drive gears 50 which cause semicircular ring gears 49 and attached transfer decks 43 to begin a passenger interchange cycle. When interchange cycles are completed, clutches 71 disengage shafts 72 and 74 and motors 56 re-orientate cams 53 180 degrees, flat sides out.

Transfer decks located along pedestrian walks 55 can be spaced to continuously align with transfer decks 43 along accelerating synchroveyors 1, hence, passenger loading and unloading can occur at continuous points along the circuits.

*General description of preferred motive power apparatus*

To facilitate continuous, dependable synchroveyor operation and therein preclude costly and inconvenient shutdowns for maintenance of propulsion apparatus, preferably there is provided a multiplicity of independent, stationary drive stations to apply motive force to the synchroveyor circuits at as many points as are required to assure that power failure at one drive station will not alter synchroveyor performance. An advantage of multiple drive stations is that it enables the synchroveyor system to be expanded by the installation of additional power units rather than replacement of the original units.

FIGURES 13, 14 and 15 show an individual drive station. Continuous cables 92 are gripped by spring operated clamps 98 at the undersides of synchroveyors 1 and 2. The cables 92 loop over pulleys 93 and under pulleys 85 mounted to pulley assemblies 94. Motors 82 apply power to the pulleys 85 which in turn drive the pulleys 93 and thereby exert linear forces on cable clamps 98 to pull the synchroveyors along the system. As each successive cable clamp 98 reaches a drive station 17 it opens and releases segments of cable 92 which are then driven through a pulley assembly 94 and are returned to the clamps 98 upon leaving the assembly 94. Hydraulic cylinders 90 mounted to pulley assemblies 94 exert compressive forces on pulleys 85 which are mounted to permit vertical movement, to keep cables 92 in sufficient tension to provide necessary driving friction. Pressure valves of known types used in conjunction with the hydraulic system maintain effective control of cable tension to compensate for slack and to assure smooth transfer of power.

*Specific description of preferred motive power apparatus*

As shown in FIGURES 13, 14 and 15, D.C. motors 83 (or other power sources) transfer mechanical power through shafts 83 and bevel gears 84 to drive pulleys 85. Yokes 86 fixed to axle housings 87 reside in channels 88 fixed to the inside of pulley assembly structure 89 to permit vertical movement. Hydraulic cylinders 90 secured to bars 91 fixed rigidly between sides of pulley assembly structure 89 exert vertical loads upon yokes 86 thereby tensioning cables 92 looped over pulleys 93 and under pulleys 85.

Pulley assemblies 94 are suspended by springs 95 to track beam structures 96 to enable slight vertical and lateral movements, but movement along a longitudinal axis is restricted by buttresses 97. Successive cable clamps 98 pass over the drive stations causing wheels 99 and 100 to contact flanges and beds (respectively) of track plates 103 secured to flanges of pulley assembly structures 89 to assure proper vertical and lateral alignment of pulley assemblies 94 with synchroveyors 1 and 2. (See also FIGURES 6, 10, 16 and 17.) As clamps 98 are drawn along track plates 103, the flanges exert lateral forces on wheels 100 to compress springs 101 and thereby open jaws 102 releasing cables 92. Since multiplicities of clamps 98 retain cables at short distance intervals all along the circuits, cable release at drive stations will have a negligible affect on the system. Close interval securement of cables also renders operational effects resulting from expansion or contraction of cables 92 due to temperature changes negligible since hydraulic cylinder 90 easily effects the necessary compensations. Upon passing pulley assemblies 94, "fingers" on jaws 102 engage cables 92. As flanges on track plates 103 become farther apart at successive intervals of distance, wheels 99 move apart, and jaws 102 move together drawing cables 92 into place (see particularly FIGURE 16).

Spring fasteners 104 attaching the track plate structure 105 to support structure 106 enables track plate 103 alignment compensations, and entry guides 107 receive wheels 100 and protect said wheels from damage upon entry. It should be noted that drive stations illustrated in FIGURES 13, 14 and 15 are symmetrical to allow bi-directional propulsion of the accelerating synchroveyors 1 when constant speed synchroveyors 2 are not in use.

Although preferred embodiments of the invention have been disclosed herein, it is to be understood that they are merely exemplary. It is contemplated that various modifications and improvements may be made therein, and it is intended to encompass in the following claims all such modifications and improvements as fall within the true spirit and scope of the invention.

What is claimed is:

1. In combination:
   at least one elongate closed loop passenger carrying constant speed conveyor;
   a plurality of separate closed loop passenger carrying variable speed conveyors inside said constant speed conveyor;
   each of said variable speed conveyors being intermittently operable between a standstill and the speed of said constant speed conveyor;
   each of said variable speed conveyors being partially closely adjacent a portion of said constant speed conveyor and partially substantially diverging from said constant speed conveyor;
   said variable speed conveyors and said constant speed conveyor having means for passenger interchange therebetween;
   said means for passenger interchange comprising semi-circular passenger transfer platforms on said variable speed conveyors, corresponding and complementary semi-circular passenger transfer platforms on said constant speed conveyor, and means for rotatably exchanging said platforms between said variable speed conveyors and said constant speed conveyor;
   stationary platform means closely adjacent said variable speed conveyors;
   said means for passenger interchange further comprising semi-circular passenger transfer platforms on said variable speed conveyors, corresponding and complementary semi-circular passenger transfer platforms on said stationary platform means, and means for rotatably exchanging said platforms between said variable speed conveyors and said stationary platform means.

2. In combination:
   a plurality of elongate closed loop passenger carrying constant speed conveyors having the same speed;
   said constant speed conveyors having their elongate dimensions oriented in different directions;
   a plurality of passenger carrying variable speed closed loop conveyors inside said constant speed conveyors and intermittently operable between a standstill and the speed of said constant speed conveyors;
   at least one of said variable speed conveyors having a substantial length closely adjacent a first one of said constant speed conveyors, and also having a substantial length closely adjacent a second one of said constant speed conveyors;
   and means for passenger interchange between said variable speed conveyors and said constant speed conveyors providing transfer of passengers between said first constant speed conveyor and said second constant speed conveyor;
   said means for passenger interchange comprising semi-circular passenger transfer platforms on said variable speed conveyors, corresponding and complementary semi-circular passenger transfer platforms on said constant speed conveyors, and automatic means for rotatably exchanging said platforms between said variable speed conveyors and said constant speed conveyors;
   stationary platform means closely adjacent said variable speed conveyors;
   and means for passenger transfer between said variable speed conveyors and said stationary platform means, comprising corresponding and complementary semi-circular passenger transfer platforms between said variable speed conveyors and said stationary platform means.

3. In a transportation system of the type including at least one variable speed conveyor and an adjacent load carrying means maintained in a laterally spaced relation to said conveyor for permitting an unimpeded relative longitudinal movement therebetween, apparatus for interchanging loads between said conveyor and said load carrying means comprising:
   a pair of similar transfer platforms of generally semi-circular configuration positioned respectively on said conveyor and said load carrying means;
   means for establishing zero relative movement between said conveyor and said load carrying means for a predetermined time interval with said pair of platforms in alignment to define a generally circular platform outline;
   bridge means carried by at least one of said pair of transfer platforms and adapted during said predetermined time interval to be extended across the space separating said transfer platforms of respectively said conveyor and said load carrying means for effecting a bridged engagement between said aligned transfer platforms;
   and means for rotatably exchanging said transfer platforms between said conveyor and said load carrying means to transfer loads therebetween when said transfer platforms are in said bridged engagement.

4. The combination according to claim 3 in which said load carrying means is a stationary loading dock in which said transfer platforms each have a linear side portion which is normally co-linear with a linear side of the one of said conveyor and said load carrying means on which said platform is positioned.

5. The combination according to claim 3 in which said load carrying means is a constant speed conveyor and in which said transfer platforms each have a linear side portion which is normally co-linear with a linear side of the one of said conveyors on which said platform is positioned.

6. A transportation system comprising:
   an elongate closed loop constant speed conveyor;
   a plurality of closed loop variable speed conveyors, adapted to be selectively operable between a standstill and the speed of said constant speed conveyor, said variable speed conveyors each having a portion of their respective closed loops closely adjacent and partially diverging from said constant speed conveyor;
   a plurality of stationary loading platform zones positioned at spaced intervals along each of said variable speed conveyors;

drive means for regularly and repetitively cycling each of said variable speed conveyors between a standstill and said constant speed a plurality of times in each complete circuit of said closed loop of said variable speed conveyor;

means for interchanging loads between predetermined ones of said stationary loading platform zones and said variable speed conveyor, and said variable speed conveyor and said constant speed conveyor, respectively, only when zero relative speeds are established therebetween;

synchronizing means, including said drive means, coordinating movement of said variable speed conveyors and said constant speed conveyor for enabling a plurality of loads originating from different stationary loading platform zones to be concurrently transported to any other of said plurality of stationary loading platform zones of said system within an uninterrupted forward motion.

7. A transportation system comprising:

a plurality of elongate closed loop conveyors operable at equal constant speeds and having their elongate dimensions oriented in different directions;

a plurality of variable speed conveyors located within each of said constant speed conveyors and each adapted to be selectively operable between a standstill and said constant speed and each further having a closed loop path partially closely adjacent and partially diverging from the one of said constant speed conveyors which encompasses it, at least one of said plurality of variable speed conveyors additionally having a portion of its loop path closed adjacent a nonencompassing constant speed conveyor;

a plurality of stationary loading platform zones positioned at spaced points along each of said variable speed conveyors;

drive means for regularly and repetitively cycling each of said variable speed conveyors between said constant speed and a standstill a plurality of times in each complete circuit of said closed loop of said variable speed conveyor;

means for interchanging loads between each of said stationary loading platform zones and its associated one of said variable speed conveyors and for interchanging loads between said constant speed conveyors, respectively, only when zero relative speeds are established therebetween;

synchronizing means including said drive means coordinating movement of all of said variable speed conveyors and all of said constant speed conveyors for enabling a plurality of loads originating from different stationary loading platform zones to be concurrently transported to any other of said plurality of stationary loading platform zones of said system with an uninterrupted forward motion.

References Cited

UNITED STATES PATENTS

| | | | |
|---|---|---|---|
| 331,834 | 12/1885 | Solano | 104—204 |
| 881,377 | 3/1908 | Cook | 104—20 |
| 1,001,170 | 8/1911 | Sayer | 104—20 |
| 2,657,642 | 11/1953 | Babcock | 104—28 |
| 2,981,202 | 4/1961 | Turner | 104—25 |
| 2,385,025 | 9/1945 | Pethick | 214—38 |

ARTHUR L. LA POINT, *Primary Examiner.*

D. F. WORTH, *Assistant Examiner.*

U.S. Cl. X.R.

104—25

UNITED STATES PATENT OFFICE
CERTIFICATE OF CORRECTION

Patent No. 3,421,450 January 14, 1969

Larry S. Bell

It is certified that error appears in the above identified patent and that said Letters Patent are hereby corrected as shown below:

Column 14, line 12, "veyors, respectively," should read -- veyors and said closely adjacent portions of said variable speed conveyors, respectively, --.

Signed and sealed this 31st day of March 1970.

(SEAL)
Attest:

Edward M. Fletcher, Jr.    WILLIAM E. SCHUYLER, JR.
Attesting Officer                  Commissioner of Patents